Sept. 17, 1929. F. W. ENGLAND 1,728,264
MILLING CUTTER
Filed April 7, 1927
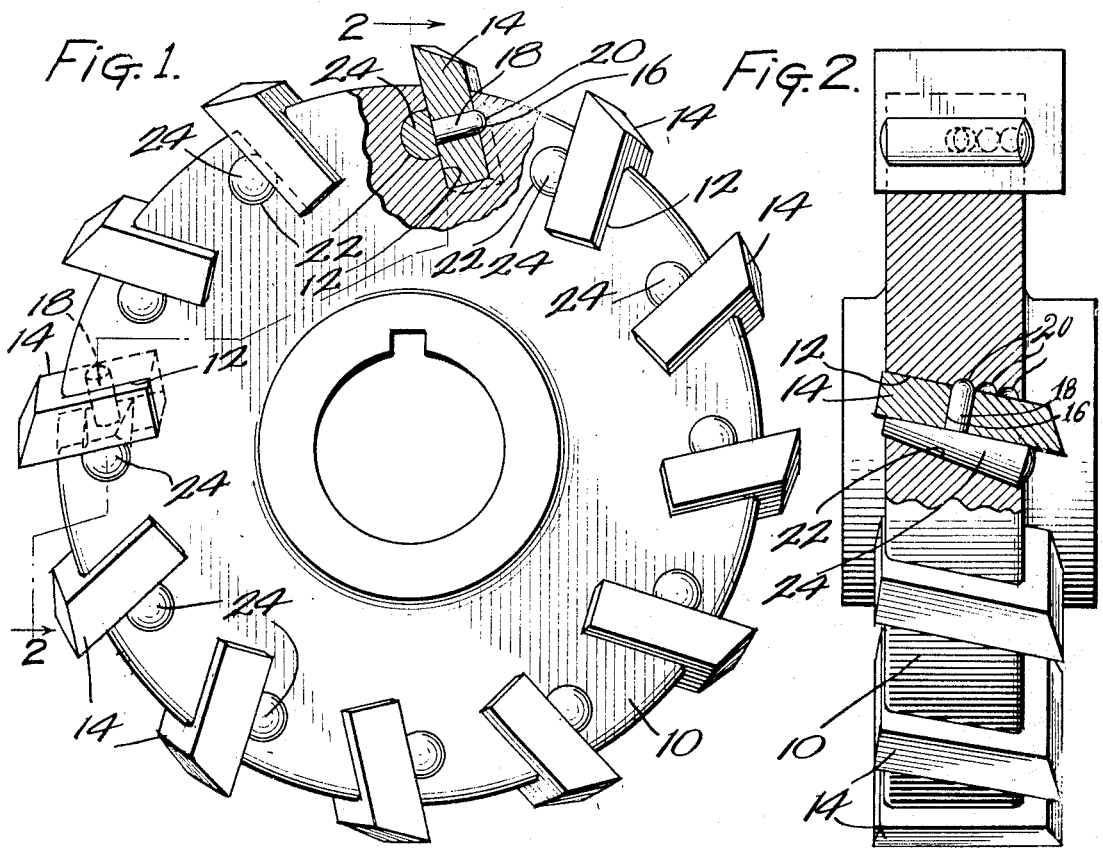
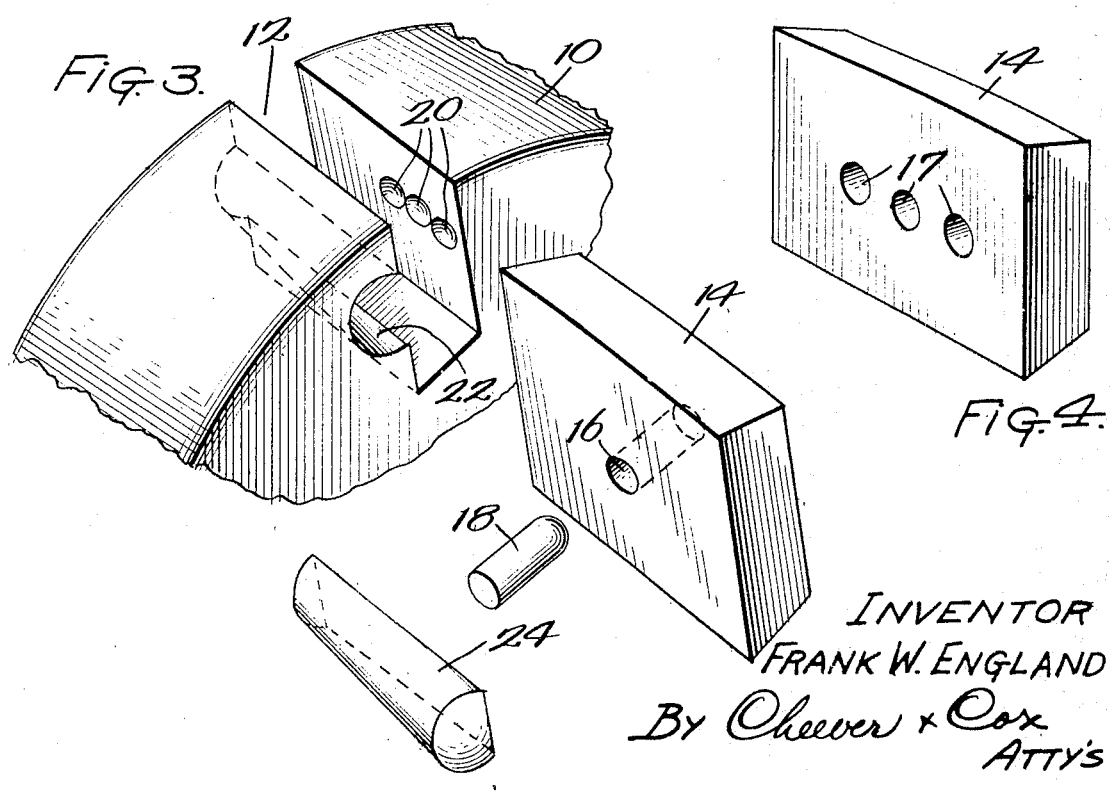
INVENTOR
FRANK W. ENGLAND
By Cheever & Cox
ATTY'S Patented Sept. 17, 1929

1,728,264

UNITED STATES PATENT OFFICE

FRANK W. ENGLAND, OF CHICAGO, ILLINOIS, ASSIGNOR TO ILLINOIS TOOL WORKS, OF CHICAGO, ILLINOIS, A CORPORATION OF ILLINOIS

MILLING CUTTER

Application filed April 7, 1927. Serial No. 181,685.

My invention relates to milling cutters of the inserted tooth type, and the object of the invention is to provide means by which a tooth or blade may be readily removed or inserted and may be rigidly and securely held in any one of a plurality of definite positions, even though subjected to unusually severe operating conditions.

I obtain this object by the mechanism illustrated in the accompanying drawing in which Figure 1 is a side view of a cutter embodying the invention, the same being partly in section.

Figure 2 is a sectional view on the triangular line 2—2 Figure 1.

Figure 3 is a fragmentary perspective view of the type sometimes referred to as an "exploded" view wherein the parts are separated from each other but placed in such relative positions as to indicate the manner in which they may be assembled.

Figure 4 shows a modified form of cutting blade.

Like numerals denote like parts throughout the several views.

In the form illustrated the cutter has a body 10, whose general form is similar to those already known. In the periphery it has a set of slots 12 which are arranged approximately radially, but are inclined somewhat both with respect to a radius and with respect to the axis of revolution of the cutter in accordance with known practice. This however is a detail which may be varied.

These slots are for the reception of cutting blades 14, which are of known type except that each has an aperture 16 passing through it from side to side for the reception of a locking pin 18. By preference the forward end of the pin is rounded and is adapted to seat in either one of a plurality of recesses or shallow depressions 20 sunk into one wall of the slots as illustrated in perspective in Figure 3.

The cutter here illustrated is primarily a side milling cutter, that is, the blades are intended to cut at the side of the body instead of at the outer end, and in this type the recesses 20 are arranged in a row approximately parallel to the axis in distinction to approximately radial. The row is approximately at right angles to the cutting edge of the blade, the purpose being to provide adjustment in the direction of wear of the blade.

In the side walls opposite to the recesses 20 are taper slots 22 which form key seats for wedges 24, whose function is to back up the pins 18 and hold them in active position. While I do not wish to be limited to this form of wedge, it is constructed upon known principles, being made from a straight cylindrical pin which is reduced to flatness on one side along a plane slightly oblique to the axis. Slot 22 is correspondingly formed.

In practice, when a blade is to be inserted a pin 18 is inserted into the aperture 16, the blade put in place and the pin pushed forward so its rounded end will seat in one of the recesses 20. The recess chosen depends upon the position to which the blade is to be adjusted. As the blade wears away, due to use and sharpening, it needs to be adjusted forward, and this can readily be accomplished by putting the pin into the proper recess. After these parts are properly assembled the wedge or key 24 is inserted into slot 22 behind the pin and as it is cylindrical at the back it adjusts itself with its flat surface firmly seating against the surface of the blade and thus holds all of the parts in position.

In Figure 4 is shown a blade having a row of holes 17 similar to the hole 16. This row is approximately at right angles to the cutting edge and affords a wider range of adjustment. Also, by spacing these holes differentially with respect to the recesses 20 finer adjustments can be made. To illustrate, if the holes 17 are spaced one and a half times as far apart as the recesses 20, it will be possible to obtain an adjustment equal to half the distance between two of said recess.

Having thus described my invention what I claim as new and desire to secure by Letters Patent is:

1. A milling cutter having a slotted body and blades for insertion into the slots, the blades having apertures extending therethrough and there being recesses in the walls of the slots, pins passing through the apertures and entering the recesses for locking the blades in place, said recesses conforming substantially in shape to the contour of the extremity of the pin received thereby, and means engaging and holding the pins in locking position.

2. A milling cutter having a body with slots therein, each slot having a recess in one wall, blades adapted to be inserted into said slots, each blade having an aperture extending therethrough, locking pins adapted to pass through the apertures into the recesses, said recesses conforming substantially in shape to the contour of the extremity of the pin received thereby, and a removable element for engaging and backing up each pin to hold the same in locking position.

3. A milling cutter having a body with slots therein, each slot having a recess in one wall, blades adapted to be inserted into said slots, each blade having an aperture extending therethrough, locking pins adapted to pass through the apertures into the recesses, said recesses conforming substantially in shape to the contour of the inner extremity of the pin received thereby, and a wedge traversing the cutter body for backing up each pin, there being cavities formed in the walls of the slots opposite to the recesses for accommodating said wedges.

4. A milling cutter having a body with slots formed therein, there being a row of recesses formed in one wall of each slot, the row extending substantially at right angles to the cutting edge of the blade, the blades each having an aperture passing through them, and a locking pin passing through the apertures to enter any one of said recesses for holding the blade in adjusted position, each of said recesses conforming substantially in shape to the contour of the extremity of the pin received thereby, and means engaging behind each pin and traversing the cutter body to hold it in acting position.

5. A milling cutter having a body with slots therein, each slot having a recess in a wall thereof, blades adapted to be arranged in said slots, each blade having a row of apertures formed therethrough, the row being arranged approximately at right angles to the cutting edge of the blade, a locking pin adapted to pass through any one of said apertures and to enter said recess, said recesses conforming substantially in shape to the contour of the extremity of the pin received thereby, and means engaging and holding the locking pins in position and extending transversely of the cutter body.

6. A milling cutter having a body with slots formed therein, there being a row of recesses formed in a wall of each slot, the row extending substantially at right angles to the cutting edge of the blade, each blade having a row of apertures, the row being arranged substantially at right angles to the cutting edge of the blade, a locking pin adapted to pass through any of said apertures to enter said recess for holding the blade in adjusted position, said recesses conforming substantially in shape to the contour of the extremity of the pin received thereby, and means traversing the cutter body for holding the pins in acting position.

7. In a milling cutter, in combination, a body having slots therein, apertured cutting blades for insertion into said slots, there being a depression in one wall of each slot, and a taper slot in the opposite wall forming a key seat, a wedge key seating in each key seat, and a locking pin passing through each blade and projecting into a recess and being held in position by said wedge, said recesses conforming substantially in shape to the contour of the extremity of the pin received thereby.

8. A milling cutter having a body provided with slots running inward from the periphery and having side walls lying in planes which are approximately radial, a cutting blade for each slot, each cutting blade having a hole through it and each slot having a row of recesses formed in a side wall thereof, a locking pin passing through said hole and projecting into a recess, said recesses conforming substantially in shape to the contour of the extremity of the pin received thereby, and a key partly embedded in the cutter body in position to engage the pin to hold it in the recess.

9. A milling cutter having cutting blades and a body with slots for the blades, a locking pin for each blade, and means for holding the locking pins in acting position, each blade having a row of holes formed therethrough and adapted to carry the pins and having a row of recesses in a wall thereof, each said recess being adapted to receive the end of a locking pin, the holes in the blades having a different spacing from the recesses in the side walls.

10. A milling cutter having having cutter blades and a body with slots for the blades, a locking pin for each blade and means for holding the locking pins in operative position, said blades having a number of holes extending therethrough adapted to receive the pins, a wall in each of the slots being provided with a number of recesses, each of said recesses being adapted to receive the extremity of a locking pin, the holes in the blades being arranged relative to the recesses in the walls so as to permit of varied lateral adjustments of the blade.

In witness whereof, I have hereunto subscribed my name.

FRANK W. ENGLAND.